United States Patent [19]

Wagner

[11] Patent Number: 5,464,586

[45] Date of Patent: Nov. 7, 1995

[54] AQUEOUS SLIP AND MOLD-RELEASE AGENT AND PROCESS FOR THE MOLDING AND VULCANIZATION OF TIRES AND OTHER RUBBER ARTICLES

[75] Inventor: Herbert Wagner, Schönborn, Germany

[73] Assignee: Rhein Chemie Rheinau GmbH, Mannheim, Germany

[21] Appl. No.: 217,225

[22] Filed: Mar. 24, 1994

Related U.S. Application Data

[62] Division of Ser. No. 737,989, Jul. 30, 1991, abandoned.

[30] Foreign Application Priority Data

Aug. 2, 1990 [DE] Germany .......................... 40 24 565.9
Mar. 8, 1991 [DE] Germany .......................... 41 07 932.9

[51] Int. Cl.⁶ .................. B29C 33/60; C10M 147/02
[52] U.S. Cl. ................ 264/130; 264/326; 252/25; 252/28; 252/29; 252/49.3; 252/49.5; 252/49.6; 252/49.7; 252/58; 252/30
[58] Field of Search ............. 252/58, 49.3, 49.5, 252/49.6, 25, 28, 29, 49.7, 30; 264/130, 326; 106/38.25, 38.3, 38.35, 38.6

[56] References Cited

U.S. PATENT DOCUMENTS

| | | | |
|---|---|---|---|
| Re. 33,124 | 12/1989 | Singer | 252/18 |
| 2,937,406 | 5/1960 | Toddy | 425/53 |
| 3,713,851 | 1/1973 | Cekada, Jr. | 252/28 |
| 3,872,038 | 3/1975 | Adams et al. | 260/13 |
| 3,896,071 | 7/1975 | Poirier . | |
| 4,043,924 | 8/1977 | Traver | 252/49.5 |
| 4,066,560 | 1/1978 | VanVleck et al. | 252/49.5 |
| 4,178,257 | 12/1979 | Berry et al. | 252/49.5 |
| 4,251,431 | 2/1981 | Carswell et al. | 252/54 |
| 4,257,902 | 3/1981 | Singer | 252/18 |
| 4,359,340 | 11/1982 | Comper et al. | 252/49.5 |
| 4,374,791 | 2/1983 | Farrissey et al. | 264/39 |
| 4,728,450 | 3/1988 | Toya et al. | 252/49.6 |
| 4,840,739 | 6/1989 | Mori et al. | 252/18 |
| 4,840,742 | 6/1989 | Hoffman | 252/49.5 |

FOREIGN PATENT DOCUMENTS 351770  1/1990  European Pat. Off. .
2734906  2/1978  Germany .
60-42494  3/1985  Japan .

OTHER PUBLICATIONS

Kunstoffe, vol. 76, 1986, No. 10, pp. 920–926, (Month Unknown).
Hoechst AG brochure (Oct. 1983).
Hoechst AG brochure, Hostaflon Information 23 (Oct. 1984).
European Search Report dated Jul. 31, 1992.
World Patent Index No. 85–095425, Abstract for JP–A–60–042,494, Mar. 6, 1985.
Patents Abstracts of Japan, vol. 7, No. 118 (May 21, 1983), abstract for JP–A–58–37094.
World Patent Index No. 84–314772, Abstract for JP–A 59–196,224, Nov. 7, 1984.
Patents Abstracts of Japan, vol. 10, No. 245, JP–A–61 076 594 Abstract, Apr. 19, 1986.
Debal et al., "Gebrauchsfertige Reifeninnenspruhlosungen," vol. 28, No. 2, pp. 89–94 (1975) (Month unknown).

Primary Examiner—Jacqueline V. Howard
Assistant Examiner—Alan D. Diamond
Attorney, Agent, or Firm—Connolly & Hutz

[57] ABSTRACT

An environment-friendly aqueous slip and mold-release agent for the manufacture of tires and other rubber articles and a process for the molding and vulcanization of tires and other rubber articles are described. The aqueous slip and mold-release agent contains 0.5 to 6 wt. % polytetrafluoroethylene, 20 to 40 wt. % mineral fillers and at least 40 wt. % water. It is sprayed onto the inside of the tire blank prior to the molding and vulcanization, so that the water contained therein evaporates, accompanied by development of a slip and release agent film. Apart from the environment-friendliness and good release effect, the new slip and mold-release agent leads, despite the high water content, to a quick evaporation of the water and thus a rapid development, desired in industrial operations, of the slip and release agent film. The excellent effectiveness of the slip and mold-release agent according to the invention results in a substantial prolongation of the life of the heating membrane used for the molding and vulcanization.

20 Claims, No Drawings

AQUEOUS SLIP AND MOLD-RELEASE AGENT AND PROCESS FOR THE MOLDING AND VULCANIZATION OF TIRES AND OTHER RUBBER ARTICLES

This application is a divisional of application Ser. No. 07/737,989, filed Jul. 30, 1991, now abandoned.

FIELD OF THE INVENTION

The invention relates to an aqueous slip and mold-release agent (abbreviated to "release agent" hereinafter) for the manufacture of tires and other rubber articles and a process for the molding and vulcanization of tires and other rubber articles using this aqueous slip and mold-release agent.

BACKGROUND OF THE INVENTION

According to the prior art, tires are molded and vulcanized by introducing the tire blanks into a spraying booth in which they are made to rotate by means of mechanical devices. A spray-gun is introduced into these rotating blanks and distributes a release agent solution on the inside of the blanks. The overspray is removed by means of vacuum or a water wall. The blank is then molded and vulcanized in a vulcanization press by means of a heating membrane (bag, bladder) whose task is to heat the tire blank, effect the vulcanization and press the tire at high pressure into negative molds (cf. the description of this procedure in DE-PS 29 25 662, DE-OS 31 46 053 and in particular the introductory part of published European patent application 0 111 100). In published European patent application 0 111 100, to avoid the disadvantages of this procedure, a process for the molding and vulcanization of tires and other rubber articles is proposed in which the heating membrane is provided, prior to the molding and vulcanization, with a cross-linked, cured, firmly-adhering elastic film of release agent that is bonded to the substrate by chemical interactions. However, the full benefit of the advantages to be achieved thereby are enjoyed only if the use of a release agent between the outside of the tire blank and the metal mold of the vulcanization press is not necessary, as the application of release agent to the inside and outside of the tire blank is generally one operation. Many existing tire-production plants are so designed, however, that such an outside release agent cannot dispensed with. In addition, the coating of the heating membrane as per European patent application 0 111 100 with a film of release agent calls for a very careful procedure, as otherwise the film of release agent on the heating membrane may be prematurely damaged or detached, thus possibly causing the life of the heating membrane to be shortened and reject tires to be produced.

The internal and external spray solutions used as release agents in the conventional procedure in most cases comprise benzinous solutions of release effective substances, which contain mineral fillers and have a benzine or total organic solvents content of the order of about 70%. These release-agent solutions obviously damage the environment or require very great expenditure on apparatus if the environment is not to be polluted. Aqueous release-agent solutions have thus already been proposed. The principle was that as little water as possible was used together with release effective substances, mineral fillers, thickeners and stabilisers, so that as little water as possible has to evaporate when a film of release agent forms. Typical aqueous release agents of this type comprise, for example, about 60 wt. % mineral fillers including thickeners and stabilizers and about 40 wt. % aqueous silicone oil emulsion (about 5–20 wt. % silicone oil, remainder water). Quite apart from the environmental disadvantages of silicone oils, it has been shown that, after the application of these aqueous release agents, a skin forms, as a result of which the water evaporates only relatively slowly when the film of release agent develops.

OBJECTS OF THE INVENTION

Therefore it is an object of the invention to provide an aqueous slip and mold-release agent for the manufacture of tires and other rubber articles which is environment-friendly and avoids the aforementioned disadvantages of the prior art.

It is a further object of the invention to provide an aqueous slip and mold-release agent for the manufacture of tires and other rubber articles which allows further use of the existing production plants without major modifications.

It is also an object of the invention to provide a process for the molding and vulcanization of tires and other rubber articles which is environment-friendly and avoids the aforementioned disadvantages of the prior art.

It is an additional object of the invention to provide a process for the molding and vulcanization of tires and other rubber articles which can be carried out in the existing production plants without the necessity of major modifications.

SUMMARY OF THE INVENTION

The invention is directed to an aqueous slip and mold-release agent for the manufacture of tires and other rubber articles which is characterized in that in contains (a) 0.5 to 6 wt. %, preferably 1.5 to 4 wt. %, polytetrafluoroethylene, (b) 20 to 40 wt. %, more particularly 25 to 35 wt. %, mineral fillers, and (c) at least 40 wt. %, preferably 50 to 75 wt. %, water.

A further subject of the invention is a process for the molding and vulcanization of tires and other rubber articles in which negative molds are pressed in a press into the blank with the help of a heating membrane under high pressure and vulcanization is effected, which is characterized in that, prior to the molding and vulcanization, the aqueous slip and mold-release agent according to the invention is sprayed on the inside of the tire blank and the water contained therein is allowed to evaporate, to develop a slip and release agent film.

Preferred embodiments of the slip and mold-release agent according to the invention and of the process according to the invention will become apparent from the dependent claims and the following description.

DETAILED DESCRIPTION OF THE INVENTION

The invention is based on the surprising discovery that, in the case of slip and mold-release agents with a high water content, skin formation largely fails to occur following application on the inside of the tire blank, so that, because of the large surface present, the water evaporates quickly and there is thus a rapid development of the desired slip and mold-release agent film.

According to the invention, polytetrafluroethylene is used in a quantity of 0.5 to 6 wt. %, more particularly 1.5 to 4 wt. %, as release effective substance. Polytetrafluoroethylene is known as a slip agent and lubricant and as a substance with a release effect in many fields of use. So-called polytetrafluoroethylene micro-powders (also called "polytetrafluoroethylene waxes") are particularly preferred according to the invention. These low-molecular-weight polytetrafluoroethylenes generally have a molecular weight of 30,000–200,000 and an average particle size of 1 to 20 μm. Their manufacture and properties are familiar to one skilled in the art (cf. e.g. "Kunststoffe", Vol. 76, 1986, No. 10, pages 920–926 and the Hoechst AG brochures relating to Hostaflon TF micro-powder, e.g. Hostaflon Information 23 dated October 1984). Commercially available polytetrafluoroethylene dispersions which contain finely dispersed polytetrafluoroethylene with a particle size of about 0.2 μm are also very suitable, particularly when combined with polytetrafluoroethylene micro-powders. The molecular weight of the polytetrafluoroethylene is normally in the range of 5,000,000 to 10,000,000 in this case. These dispersions contain, for stabilization, dispersion agents and where appropriate further additives in small quantities, such as e.g. ammonia (cf. the Hoechst AG brochures relating to Hostaflon TF 5032, e.g. Kunststoffe Hoechst Sales Information VM 394 dated October 1983).

The effectiveness of the polytetrafluoroethylene can frequently be increased by also using silicone oils known from conventional release agents. Accordingly, up to about 50% of the polytetrafluoroethylene can be replaced by silicone oil, although this is not absolutely desirable from environmental points of view. Naturally, small amounts of other conventional substances with a release effect can also be used, although this is not necessary according to the invention and, at best, offers additional advantages in special applications.

The mineral fillers are the materials known from the prior art for slip and release agents. Talc, kaolin and mica are preferred according to the invention. If talc and kaolin are used jointly, the weight ratio of talc to kaolin is about 1:1 to 4:1 and more particularly 2:1 to 3:1. The total mineral fillers content is 20 to 40 wt. %, particularly 25–35 wt. %, and preferably 27 to 32 wt. %.

The release agent according to the invention may also contain carbon black and/or graphite in a quantity of up to 10 wt. %, preferably up to 5 wt. %, the mineral fillers content being reducible accordingly in case of high carbon black and/or graphite contents.

The use of small quantities of iron stearate, i.e. up to 1 wt. %, preferably 0.3 to 0.7 wt. %, has also proved advantageous. This clearly improves the slip effect of the release agent according to the invention.

The use of wetting and dispersing agents is also desired in order to guarantee the dispersion of the solids. Non-ionic surfactants manufactured by copolymerization of propylene oxide and ethylene oxide are particularly suitable for this purpose.

These are usually block polymers in which polypropylene oxide forms the central molecule section. These surfactants are commercially available under the name Pluronic PE with various molecular weights and percentage polyethylene oxide contents in the total molecule. Suitable wetting and dispersing agent quantities are up to 2 wt. %, preferably 0.5 to 1.5 wt. %.

In order to prevent or at least reduce settlement of the solids, it is also advantageous to use normal stabilizers in quantities of 0.1 to 1.0 wt. %. Montmorillonite derivatives such as high-purity magnesium layered silicates, e.g. smectite (commercially available under the name "Bentone", cf. e.g. Roempps Chemie-Lexikon) are suitable, among others. Biopolymers such as xanthan are also good stabilizers.

It is generally undesirable that the release agent adversely affect the color of the tire or rubber article to be manufactured. The release agent according to the invention may accordingly contain small amounts of dyes. Quantities of up to 1 wt. %, preferably about 0.5 wt. %, are generally sufficient.

Depending on the product conditions in question and the desired product properties, the release agent according to the invention may also contain other conventional additives. However, these are not essential to the invention, and therefore need not be discussed in detail.

As already mentioned above, a high water content is an essential feature of the release agent according to the invention, and it accordingly contains at least 40 wt. %, particularly at least 60 wt. %, and preferably 65 to 75 wt. %, water.

It has been shown that only very small quantities of the release agent according to the invention need be used to produce the desired effect. It is thus generally sufficient to introduce it into the tire blank in such quantities that the solids content remaining after the evaporation of the water is about 3 to 15 g and particularly 3 to 10 g per car tire (with truck tires, the solids content increases according to the greater surface to be treated). This economical consumption, advantageous in itself, leads to the further advantage that the manufactured tire has a better quality, i.e. runs truer, because it has smaller quantities by weight of substances that may possibly be unevenly distributed on the inside of the tire.

In order to guarantee the large surface needed for rapid evaporation and distribute evenly the relatively small quantities of release agent, the inside spray solution according to the invention is applied by the so-called air-mix process with the inside spray solution in constant circulation, in order very largely to avoid a settlement of the solids. Alternatively, it can also be applied by means of air atomization. The spraying of the release agent according to the invention under high pressure leads to the development of an open film and thus permits the desired rapid evaporation of the water.

The inside spray solution according to the invention dries well, so that drying times of about 6 to 12 minutes at temperatures in the range 18° to 22° C. are generally sufficient.

The release agent according to the invention produces a good slip effect, good venting effect and good release effect. Overall, the release agent according to the invention is so effective that the life of the heating membrane is substantially prolonged, which naturally leads to simplifications and cost advantages in the production process. The release agent according to the invention can be sprayed without problems and evenly with minimal plant contamination. Cleaning the plant poses no difficulties. Finally, the agent according to the invention is characterized by ease of stirring and does not lead to bonding problems in the tire.

Apart from the use of the release agent according to the invention and its application in a suitable manner (see above), the process according to the invention is implemented in conventional manner, so that further explanations are to that extent unnecessary. However, it has surprisingly been shown that the process according to the invention can be combined in an extremely advantageous manner with the process known from the published European patent application 0 111 100, i.e. the use of heating membranes coated with a film of release agent in combination with the release agent according to the invention produces additional advantages in terms of the quality of the manufactured tires and the life of the heating membrane.

Practice of the invention will become further apparent from the following non-limiting examples.

EXAMPLE 1

An aqueous inside spray solution comprising 19 wt. % talc, 7 wt. % kaolin, 5 wt. % graphite, 1.7 wt. % polytetrafluoroethylene micro-powder, 0.5 wt. % iron stearate, 1.3 wt. % non-ionic surfactant (Pluronic), 0.5 wt. % dye and 65 wt. % water was prepared by intensively mixing all the constituents, and used in a production test in which about 10,000 car tires were manufactured. It was applied to the inside of the tire blanks by the air-mix method with constant circulation. The solids content of the inside spray solution applied per tire was 3 to 10 g. The performance of the release agent according to the invention was very good. The same applied to the quality of the manufactured tires. Furthermore, some 600 demoldings were carried out—a substantial and totally unexpected increase compared with the figure obtained using conventional release agents. The spraying of the inside spray solution proceeded without problems and with minimal contamination. The expenditure on cleaning the used plant was also minimal.

EXAMPLE 2

An aqueous inside spray solution comprising 32.63 wt. % talc, 6.50 wt. % graphite, 2.40 wt. % polytetrafluoroethylene micro-powder, 1.95 wt. % non-ionic surfactant (Pluronic), 2.00 wt. % silicone oil in form of a 30% aqueous emulsion, 0.26 wt. % Bentone and 54.26 wt. % water was prepared by intensively mixing all the constituents, and used in a production test. It was applied to the inside of the tire blanks by air atomization. Like in Example 1 again excellent results were achieved.

I claim:

1. In a process for molding and vulcanizing tires and other rubber articles in which negative molds are pressed into a blank with the help of a heating membrane under pressure, the improvement comprising:
   spraying the inside surface of the blank with an aqueous slip and mold-release agent comprising
   a) 0.5 to 6 wt. % polytetrafluoroethylene as a release effective substance,
   b) 20 to 40 wt. % mineral fillers,
   c) at least 40 wt. % water,
   d) up to 2 wt. % non-ionic surfactant as wetting and dispersing agent,
   e) silicone oil in an mount sufficient to replace up to 50% by weight of (a); and
   f) iron stearate present in an amount of not more than 1 wt. %, and evaporating the water in said slip and mold-release agent to leave a film of slip and mold release agent on the surface of the blank.

2. The process according to claim 1, wherein said polytetrafluoroethylene is present in an amount of 1.5 to 4 wt. %.

3. The process according to claim 1, wherein said mineral fillers are present in an amount of 25 to 35 wt. %.

4. The process according to claim 3, wherein said mineral fillers are present in an amount of 27 to 32 wt. % mineral fillers.

5. The process according to claim 1, wherein said water is present in an amount of at least 60 wt. %.

6. The process according to claim 5, wherein said water is present in an amount of 65 to 75 wt. % water.

7. The process according to claim 1, wherein the polytetrafluoroethylene is polytetrafluoroethylene micro-powder.

8. The process according to claim 7, wherein the polytetrafluoroethylene is a combination of polytetrafluoroethylene micro-powder and a polytetrafluoroethylene dispersion.

9. The process according to claim 1, wherein said mineral fillers are talc, kaolin and/or mica.

10. The process according to claim 1, wherein said agent further comprises carbon black and/or graphite is present in an mount not more than 10 wt. %.

11. The process according to claim 10, wherein said agent further comprises carbon black and/or graphite is present in an amount not more than 1 wt. %.

12. The process according to claim 2, wherein said mineral fillers are in an amount from 27 to 32 wt. %, said non-ionic surfactant is in an mount from 0.5 to 1.5 wt. and said polytetrafluoroethylene is polytetrafluoroethylene micropowder.

13. The process according to claim 12, wherein said mineral fillers are talc, kaolin and/or mica.

14. The process as claimed in claim 13, wherein said agent further comprises carbon black and/or graphite present in an amount not more than 5 wt. %.

15. The process according to claim 14, wherein iron stearate is present in an amount from 0.3 to 0.7 wt. %.

16. The process according to claim 1, wherein said agent further comprises stabilizers in an amount from 0.1 to 1 wt. %.

17. The process according to claim 16 wherein said agent further comprises a dye present in an effective amount up to 1 wt. % in order to provide color.

18. In a process for molding and vulcanizing tires and other rubber articles in which negative molds are pressed into a blank with the help of a heating membrane under pressure, the improvement consisting essentially of:
   spraying the inside surface of the blank with an aqueous slip and mold-release agent consisting essentially of the following components:
   a) 0.5 to 6 wt. % polytetrafluoroethylene as a release effective substance,
   b) 20 to 40 wt. % mineral fillers,
   c) at least 40 wt. % water,
   d) up to 2 wt. % non-ionic surfactant as wetting and dispersing agent,
   e) silicon oil in an amount sufficient to replace up to 50% by weight of component a); and
   f) iron stearate present in an amount of not more than 1 wt. %, and evaporating the water in said slip and mold-release agent to leave a film of slip and mold release agent on the surface of the blank.

19. The process according to claim 18, wherein said mineral fillers are in an amount from 27 to 32 wt. %, said non-ionic surfactant is in an amount from 0.5 to 1.5 wt. % and said polytetrafluoroethylene is polytetrafluoroethylene micro-powder and is in an amount from 1.5 to 4 wt. %.

20. In a process for molding and vulcanizing tires in which negative molds are pressed into a blank with the help of a heating membrane under pressure, the improvement consisting essentially of:
   spraying the inside surface of the blank with an aqueous slip and mold-release agent consisting of the following components:
   a) 0.5 to 6 wt. % polytetrafluoroethylene as a release effective substance,
   b) 20 to 40 wt. % mineral fillers,
   c) at least 40 wt. % water, d) up to 2 wt. % non-ionic surfactant as wetting and dispersing agent, e) silicone oil in an amount sufficient to replace up to 50% by weight of component a); and f) iron stearate present in an amount of not more than 1 wt. %, and evaporating the water in said slip and mold-release agent to leave a film of slip and mold release agent on the surface of the blank.

\* \* \* \* \*